United States Patent Office 2,952,666
Patented Sept. 13, 1960

2,952,666

PHOSPHORO-POLYESTERS AND POLYESTER-URETHANES DERIVED FROM PHOSPHORODICHLORIDATES AND ALIPHATIC GLYCOLS

Harry W. Coover, Jr., and Richard L. McConnell, Kingsport, Tenn., assignors to Eastman Kodak Company, Rochester, N.Y., a corporation of New Jersey No Drawing. Filed Sept. 11, 1957, Ser. No. 683,203

18 Claims. (Cl. 260—77.5)

This invention is concerned with certain linear phosphato polyesters, also referred to as polymeric organophosphates. This invention provides a process for producing such polymers which are viscous liquids like oil and are useful as flameproofing agents for fabrics, etc. This invention also relates to polyesterurethanes which are high melting solid polymers useful in forming excellent fibers and film of exceptional resistance to fire.

The linear phosphato polyesters of this invention are in a sense analogous to the phosphono polyesters set forth in our copending application Ser. No. 540,156 filed October 12, 1955, which was subsequent to the date of the present invention. The phosphato polyesters contain an additional oxy substituent on each phosphorus atom which serves to provide distinctly different characteristics in the polyesters and to increase their reactivity in the preparation of polyesterurethanes.

The linear phosphato polyesters of this invention could not be produced by methods known in the prior art. The problem was to find some way by which an organic phosphorodichloridate could be reacted with an aliphatic glycol so as to produce a useful polyester.

The usual polyester formation is well known in the art to be advantageously conducted at temperatures on the order of 200°–300° C. although the broader ranges sometimes mentioned refer to temperatures as low as 100° C. when preparing polyesters of the type with which this invention is concerned. However, those familiar with this field have come to believe that higher temperatures are needed to accomplish the condensation in a reasonable period of time.

The preparation of phosphorus-containing polyesters by condensation of a phosphonyl or phosphoryl dichloride with an aromatic dihydroxy compound such as hydroquinone or dihydroxy biphenyl is well known as shown in U.S. Patents 2,682,521 and 2,682,522. In the preparation of such aromatic polyesters the condensation proceeded readily in accordance with usual practice by heating the reactant mixture at temperatures of 150° C. or higher. Temperatures of as much as 200–300° C. were commonly used without appreciable side reactions. The polyester formation thereby obtained is illustrated by the following equation showing the type of recurring structural unit resulting from the polymerization:

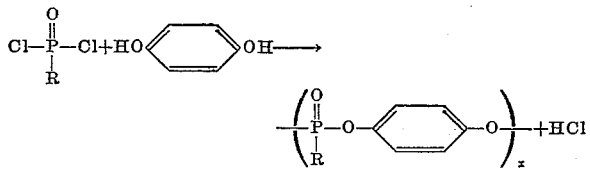

According to the prior art procedures, the HCl which formed caused no significant side reactions when dihydric phenolic compounds were employed. However, the use of aliphatic glycols failed to produce polymers apparently because a chain-terminating side reaction was experienced in the presence of HCl. It would appear that this trouble could be solved only by various involved expedients. Reducing the temperature would appear to favor further retention of HCl in the reaction mixture.

Quite unexpectedly it was found that by employing temperatures below 100° C., preferably 20–75° C., the polymerization was accomplished expeditiously producing transparent viscous oils possessing excellent characteristics.

Moreover, it was also surprising to find that these viscous liquid phosphato polyesters can be reacted with aliphatic diisocyanates to produce high melting solid polyurethanes which can be formed into useful fibers and films from which flame resistant fabrics, wrapping materials and photographic film base can be advantageously fabricated by melt extrusion or solution extrusion techniques well known in the art.

It is accordingly an object to provide new phosphorus-containing polyesters by the reaction of aliphatic glycols and phosphorodichloridates, which phosphato polyesters were not obtainable by the methods commonly employed for such polyester formation.

Another object is to provide novel viscous liquid phosphato polyesters suitable for treating fibers and fabrics so as to improve flame resistance and to impart other valuable characteristics desirable in the fabric manufacturing industry.

A further object is to provide polyesterurethanes of superior physical and chemical characteristics including great stability to heat degradation and possessing a high degree of flame resistance together with the ability to form fibers and films of especially valuable utility in those applications where heat and potential fire hazards exist as in industrial workers garments, children's party costumes, motion picture film base, lantern lenses, etc.

Other objects are apparent from the entire description and claims herein.

These and other objects are accomplished by means of this invention wherein one embodiment provides a linear phosphato polyester consisting predominantly of recurring phosphato-ester structural units having the following formula:

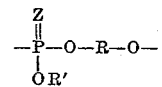

wherein Z represents an atom selected from the group consisting of oxygen and sulfur, R represents a saturated aliphatic hydrocarbon radical containing from 2 to 20 carbon atoms, and R' represents a radical selected from the group consisting of alkyl containing from 1 to 8 carbon atoms, cyclohexyl, phenyl, benzyl, tolyl, and xylyl, which polyester is normally a viscous liquid.

The phosphato-ester structural units having the above formula are designated hereinbelow by R''.

Another embodiment of this invention provides a method for making a linear phosphato polyester which comprises reacting a saturated aliphatic glycol containing from 2 to 10 carbon atoms with a phosphorodichloridate having the formula

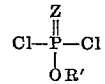

wherein Z represents an atom selected from the group consisting of oxygen and sulfur, and R' represents a radical selected from the group consisting of alkyl containing from 1 to 8 carbon atoms, cyclohexyl, phenyl, benzyl, tolyl and xylyl, while maintaining the reaction mixture at a temperature in the range of about 0° C. to about 75° C. until substantially all of the hydrogen chloride by-product has been removed.

This method requires careful control to keep the temperature below 100° C. which is the critical upper limit. By conducting the reaction within the approximate preferred range as specified there is achieved a moderating effect. This moderating effect can be enhanced through the use of inert organic solvents such as petroleum fractions like heptane, nonane, chlorinated hydrocarbons such as carbon tetrachloride, chloroform, the freons, etc., benzene, toluene, xylene, acetone, methyl ethyl ketone, diethyl ether, and other types of solvents. For practical purposes, it is also necessary to externally cool the reaction vessel and to bring the two reactants into contact on a carefully controlled basis. Agitation is essential in order to minimize development of localized excessive temperatures.

The removal of hydrogen chloride as it is evolved can be advantageously facilitated by sweeping an inert gas such as nitrogen, argon, carbon dioxide or the like through the reaction vessel. This can also be done at reduced pressure. It can also be done by having in the reaction mixture a tertiary organic base, ammonia or the like sufficient to react with the hydrogen chloride. Combinations of such means can be employed. Moreover, the reaction mixture can be washed with dilute aqueous bases such as sodium carbonate, potassium hydroxide, ammonium hydroxide, sodium bicarbonate, etc. Bubbling the inert gas through the reaction mixture is a useful technique.

It is preferred to add the phosphorodichloridate to the glycol slowly so as to keep the reaction under proper temperature control and to facilitate producing a polyester especially useful in making polyesterurethanes.

In an especially preferred embodiment of the method of this aspect of the invention no solvent is employed and an inert atmosphere and reduced pressure below 50 mm. of Hg is used to facilitate removal of hydrogen chloride.

In general, the above method can be conducted with an excess of either reactant although ease of ultimate purification favors approximately equimolar proportions. Advantageously, a slight overall excess of the glycol can be employed (1% to 5% excess by weight). This facilitates the formation of phosphato polyesters having a maximum content of terminal hydroxy groups. This characteristic favors the most advantageous properties in the polyesterurethanes which can be produced by reacting these phosphato polyesters with diisocyanates.

The aliphatic glycols which can be employed include acyclic and cyclic diols, e.g., the alkylene glycols, quinitol, 1,4-cyclohexanedimethanol, etc. Generally, such glycols contain from 2 to 20 carbon atoms.

Any of the alkylene glycols containing 2–20 carbon atoms can be employed in practicing the invention, including both the straight and branched chain glycols. Thus, for example, suitable alkylene glycols include both the branched chain glycols such as 2,4-dimethyl-1,5-pentanediol and 2-ethoxymethyl-2,4-dimethyl-1,5-pentanediol, although the glycols preferably employed are the polymethylene glycols such as ethylene glycol, butanediol, hexanediol and decanediol.

Other acyclic glycols which can be used include 3-hydroxy-2,2-dimethylpropyl 2,2-dimethylhydracrylate, $$HOCH_2C(CH_3)_2COOCH_2C(CH_3)_2CH_2OH$$

and the polyethylene glycol Carbowaxes (available from Carbide and Carbon), $HO(CH_2CH_2O)_nH$ where $n$ ranges from about 4 to about 140.

Various cyclic glycols which can be employed include those having the following formulas wherein the carbocyclic rings are fully saturated (except as indicated):

1,3-cyclohexanedimethanol,

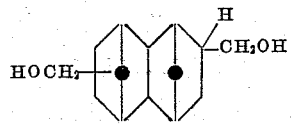

decahydro-1,4,5,8-dimethano - 2,6(or 2,7) - naphthalenedimethanol,

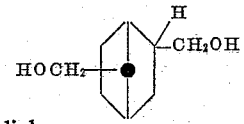

2,5-(or 2,6)norcamphanedimethanol

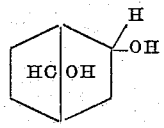

2,7-norcamphanediol,

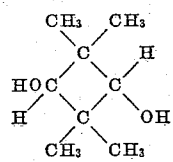

2,2,4,4-tetramethyl-1,3-cyclobutanediol,

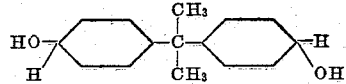

hydrogenated bis phenol A

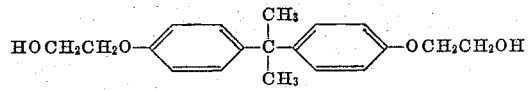

2,2'-(4,4'-isopropylidenediphenoxy)diethanol

2,3,5,6-tetramethyl-1,4-cyclohexanediol

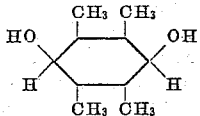

The glycol can be reacted with any of the above-defined phosphorodichloridates such as 2-ethylhexyl phosphorodichloridate, 3,3-dimethyl pentyl phosphorodichloridate, phenyl phosphorodichloridate, cyclohexyl phosphorodichloridate, benzyl phosphorodichloridate, p-tolyl phosphorodichloridate, phenyl thiophosphorodichloridate, tert. butyl thiophosphorodichloridate, methyl phosphorodichloridate, decyl phosphorodichloridate, etc. Equivalent compounds are those which may possess other inert substituents which do not have any substantial adverse effect upon the chemical and physical properties of the phosphato polyester being produced.

Another important embodiment of this invention relates to products formed by reacting hydroxyl terminated phosphato polyesters provided by this invention with aliphatic or aromatic diisocyanates. Thus, this embodiment provides a highly polymeric high melting fiber forming polyesterurethane consisting predominantly of macromolecules containing the following structural units:

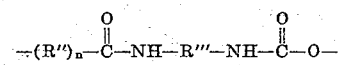

wherein R'' is a phosphato-ester structural unit having the following formula:

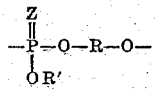

wherein Z, R and R' have already been defined, R''' represents the radical remaining after deleting the isocyanate groups from an aliphatic hydrocarbon diisocyanate containing from 6 to 12 carbon atoms, and $n$ represents a positive integer.

As is apparent hereinabove, $n$ is a value such that the corresponding linear phosphato polyester is ordinarily a viscous liquid. Thus, $n$ may range from 3–4 to 10–20 or higher.

These polyesterurethanes are especially valuable for preparing fibers useful for the manufacture of both woven and unwoven fabrics which are especially characterized by exceptional resistance to burning. Moreover, such fabrics possess other valuable qualities required for good fabrics in general.

The details as to the preparation of such fiber forming polyesterurethanes are well known in the art as illustrated in numerous patents and published articles, for example U.S. Patent No. 2,511,544. Generally it is preferred to use an inert solvent such as xylene, toluene, dioxane, methyl ethyl ketone, acetone, chlorobenzene, various freons, etc. The condensation reaction is more rapid at elevated temperatures such as 30°–50° or higher. The solvent or mixture of solvents can be selected for whatever temperature is deemed preferable. The polymer generally separates as a precipitate from the solvent and can be heated to remove residual solvent and to further increase the molecular weight, as by heating in vacuo. Condensing agents are unnecessary although they can be employed in some cases if desired. The polymer can be melt extruded to form fibers or film which can be stretched to orient the molecules and then heat set. However, such treatment may not be necessary for some applications as in making unwoven fabrics or films designed for use as wrapping materials. As previously mentioned, the ultimate products are characterized by valuable general properties such as softening points above 150° C. and are most particularly distinguished by high resistance to burning.

An embodiment of this invention provides thermoplastic fibers softening at 150°–300° C. formed from at least one polyesterurethane consisting predominantly of the macromolecules defined above.

This invention can be further illustrated by the following examples of preferred embodiments although it will be understood that these examples are included merely for purposes of illustration and are not intended to limit the scope of the invention unless otherwise specifically indicated:

*Example 1.—Polymeric organophosphate from 2-ethylhexyl phosphorodichloridate and 1,4-butanediol*

1,4-butanediol (36.0 g., 0.4 mole) was stirred while 2-ethyhexyl phosphorodichloridate (98.8 g., 0.4 mole) was added dropwise. Nitrogen was swept through the reaction vessel and the temperature was maintained in the 20–40° C. range by external cooling with ice water. The reaction mixture was stirred at room temperature for 2 hours and then heated at about 60° C. for two more hours. By this time the evolution of HCl from the reaction mixture has practically stopped. The reaction mixture was placed under reduced pressure to complete the removal of the HCl. The product was a transparent viscous oil.

A white solid polymer was obtained by reacting this viscous oily product with hexamethylene diisocyanate. This solid polymer could be spun into fibers which were extremely flame resistant.

*Example 2.—Polymeric organophosphate from butyl phosphorodichloridate and ethylene glycol*

Ethylene glycol (62.1 g., 1.0 mole) and pyridine (158.2 g., 2.0 moles) were dissolved in 500 ml. of dry benzene and stirred while butyl phosphorodichloridate (191.0 g., 1.0 mole) was added dropwise. The temperature was maintained below 40° C. with external cooling. After stirring for 4 hours, the pyridine hydrochloride was filtered off and the solvent removed under reduced pressure. The product was a light tan, transparent, viscous oil.

This material gave solid polymers when reacted with diisocyanates.

*Example 3.—Polymeric organophosphate from cyclohexyl phosphorodichloridate and 1,5-pentanediol*

This viscous oily product was prepared from 1,5-pentanediol (104.2 g., 1.0 mole) and cyclohexyl phosphorodichloridate (217.0 g., 1.0 mole) according to the procedure of Example 1.

*Example 4.—Polymeric organophosphate from phenyl phosphorodichloridate and 2-ethoxymethyl-2,4-dimethyl-1,5-pentanediol*

This transparent oily product was prepared from phenyl phosphorodichloridate (211.0 g., 1.0 mole) and 2-ethoxymethyl-2,4-dimethyl-1,5-pentanediol (190.3 g., 1.0 mole) according to the precedure of Example 1.

*Example 5.—Polymeric organophosphate from p-chlorophenyl phosphorodichloridothionate and 1,5-pentanediol*

This viscous oily product was obtained from p-chlorophenyl phosphorodichloridothionate (230.4 g., 1.0 mole), 1,5-pentanediol (104.2 g., 1.0 mole) and pyridine (158.2 g., 2.0 moles) according to the procedure of Example 2 except that 1,1,1-trichloroethane (1,000 ml.) was used as the solvent rather than benzene.

This oily product gave solid polymers when reacted with diisocyanates.

*Example 6*

The process described in Example 1 was repeated replacing the 1,4-butanediol with an equimolecular quantity of 1,4-cyclohexanedimethanol. A viscous oily polymer was obtained.

*Example 7.—Polyesterurethanes*

Examples 1, 2, 5 and 6 refer to polyesterurethanes prepared from the linear phosphato polyesters of this invention prepared by the condensation of equimolecular quantities of reactants. In the above examples, the original polyester contains some phosphate as well as hydroxyl end groups. By using slightly less than an equimolecular quantity of the phosphorodichloridate there can be achieved an even higher proportion of hydroxyl end groups, which result is especially advantageous for preparing polyesterurethanes.

The procedure of Example 1 was repeated except for the employment of an equimolar quantity of 1,4-cyclohexanedimethanol in lieu of the 1,4-butanediol and only 95 g. instead of 98.8 g. of the phosphorodichloridate. Ten parts by weight of the transparent viscous oil produced was slowly added to 30 parts of dioxane in which there had been dissolved 3 parts of tetramethylene diisocyanate. The temperature was controlled by the boiling point of the solvent. A linear highly polymeric product was obtained with only a small degree of crosslinking whereby the polymer was thermoplastic and could be melt spun or extruded.

The procedure of Example 2 was repeated except that only 185.0 g. of the phosphorodichloridate was used and the solvent was not removed. This solution was added slowly to a solution of 30 g. of hexamethylene diisocyanate dissolved in benzene. The polyesterurethane was separated by filtration, dried in vacuo at 150° C. and formed into fibers and film by melt extrusion techniques.

The polyester produced as described in Example 6 was condensed in a manner similar to that just described with hexamethylene diisocyanate. The polyesterurethane produced had extra good general physical and chemical characteristics including resistance to burning.

*Example 8.—Polymeric organophosphate from phenyl phosphorodichloridate and 2,5-(or 2,6) norcamphanedimethanol*

This polymer was prepared from 2,5-(or 2,6) norcamphanedimethanol (164 g., 1.05 moles) and phenyl phosphorodichloridate (211 g., 1.0 mole) according to the procedure of Example 1. A white solid polymer was obtained by reacting this polyester with hexamethylene diisocyanate.

Similar results were obtained using 1,3-cyclohexanedimethanol, decahydro-1,4,5,8-dimethano-2,6(or 2,7) naphthalenedimethanol, 2,7-norcamphanediol, 3-hydroxy-2,2-dimethylpropyl 2,2-dimethylhydracrylate, 2,2,4,4,-tetramethyl-1,3-cyclobutanediol, and polyethylene glycol 200 (a Carbowax from Carbide and Carbon Chemicals Company).

Other polyesterurethanes having properties as described above can be similarly prepared and formed into fibers and film useful in textiles, wrapping materials, photographic film base for either black and white or color emulsions, etc. Such film base is especially valuable for motion picture film which is to be subjected to extremely high temperatures where heat degradation and fire hazards are serious considerations.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A linear phosphato polyester having the following formula:

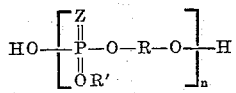

wherein Z represents an atom selected from the group consisting of oxygen and sulfur, R represents a saturated aliphatic hydrocarbon radical containing from 2 to 20 carbon atoms, and R' represents a radical selected from the group consisting of alkyl containing from 1 to 8 carbon atoms, cyclohexyl, phenyl, benzyl, tolyl, and xylyl, and wherein $n$ is a positive integer of from about 3 to about 20 such that the polyester is normally a viscous liquid.

2. A polyester as defined in claim 1 wherein Z is oxygen, R is a 1,4-butylene radical and R' is a 2-ethylhexyl radical.

3. A polyester as defined in claim 1 wherein Z is oxygen, R is an ethylene radical and R' is a butyl radical.

4. A polyester as defined in claim 1 wherein Z is oxygen, R is a 1,5-pentylene radical and R' is a cyclohexyl radical.

5. A polyester as defined in claim 1 wherein Z is oxygen, R is a 2-ethoxymethyl-2,4-dimethyl-1,5-pentylene radical and R' is a phenyl radical.

6. A polyester as defined in claim 1 wherein Z is sulfur, R is a 1,5-pentylene radical and R' is a p-chlorophenyl radical.

7. A method for making a linear phosphato polyester which comprises reacting a saturated aliphatic glycol containing from 2 to 20 carbon atoms with a phosphorodichloridate having the formula

wherein Z represents an atom selected from the group consisting of oxygen and sulfur, and R' represents a radical selected from the group consisting of alkyl containing from 1 to 8 carbon atoms, cyclohexyl, phenyl, benzyl, tolyl and xylyl, while maintaining the reaction mixture at a temperature in the range of about 0° C. to about 75° C. until substantially all of the hydrogen chloride by-product has been removed.

8. A method as defined in claim 7 wherein the glycol is 1,4-butanediol, Z is oxygen and R' is a 2-ethylhexyl radical.

9. A method as defined in claim 7 wherein the glycol is ethylene glycol, Z is oxygen and R' is a butyl radical.

10. A method as defined in claim 7 wherein the glycol is 1,5-pentanediol, Z is oxygen and R' is a cyclohexyl radical.

11. A method as defined in claim 7 wherein the glycol is 2-ethoxymethyl-2,4-dimethyl-1,5-pentanediol, Z is oxygen and R' is a phenyl radical.

12. A method as defined in claim 7 wherein the glycol is 1,5-pentanediol, Z is sulfur and R' is a p-chlorophenyl radical.

13. A highly polymeric high melting fiber forming polyesterurethane consisting predominantly of macromolecules containing the following structural units:

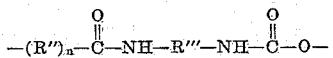

wherein R'' is a phosphato-ester structural unit having the following formula:

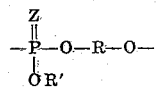

wherein Z represents an atom selected from the group consisting of oxygen and sulfur, R represents a saturated aliphatic hydrocarbon radical containing from 2 to 20 carbon atoms, R' represents a radical selected from the group consisting of alkyl containing from 1 to 8 carbon atoms, cyclohexyl, phenyl, benzyl, tolyl and xylyl, R''' represents the radical remaining after deleting the isocyanate groups from an aliphatic hydrocarbon diisocyanate containing from 6 to 12 carbon atoms, and $n$ represents a positive integer having an average value of from 3 to 20.

14. A polyesterurethane as defined in claim 13 wherein R is a 1,4-butylene radical, Z is oxygen, R' is a 2-ethylhexyl radical and R''' is a hexamethylene radical.

15. A polyesterurethane as defined in claim 13 wherein R is a 1,4-cyclohexanedimethylene radical, Z is oxygen, R' is a 2-ethylhexyl radical and R''' is a tetramethylene radical.

16. A polyesterurethane as defined in claim 13 wherein R is an ethylene radical, Z is oxygen, R' is a butyl radical and R''' is a hexamethylene radical.

17. A thermoplastic fiber softening within the range of 150°–300° C. of a polyesterurethane as defined in claim 13.

18. A thermoplastic film softening within the range of 150°–300° C. of a polyesterurethane as defined in claim 13.

References Cited in the file of this patent

UNITED STATES PATENTS

| | | |
|---|---|---|
| 2,058,394 | Arvin | Oct. 27, 1936 |
| 2,374,136 | Rothrock | Apr. 17, 1945 |
| 2,435,252 | Toy | Feb. 3, 1948 |
| 2,572,076 | Toy | Oct. 23, 1951 |
| 2,612,488 | Nelson | Sept. 30, 1952 |
| 2,636,876 | Zenftman et al. | Apr. 28, 1953 |
| 2,674,590 | Zenftman et al. | Apr. 6, 1954 |
| 2,716,100 | Coover et al. | Aug. 23, 1955 |
| 2,716,101 | Coover et al. | Aug. 23, 1955 |
| 2,743,258 | Coover | Apr. 24, 1956 |
| 2,835,652 | Haven | May 20, 1958 |